United States Patent
Komiya et al.

(10) Patent No.: US 6,794,342 B2
(45) Date of Patent: Sep. 21, 2004

(54) GREASE COMPOSITION AND ROLLING BEARING LUBRICATED BY THE GREASE COMPOSITION

(75) Inventors: Hiroshi Komiya, Kashihara (JP); Atsushi Yao, Kashihara (JP); Nao Ito, Neyagawa (JP); Youzou Taniguchi, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/098,810

(22) Filed: Mar. 14, 2002

(65) Prior Publication Data

US 2002/0183213 A1 Dec. 5, 2002

(30) Foreign Application Priority Data

Mar. 14, 2001 (JP) .................................... P2001-071692

(51) Int. Cl.$^7$ ........................................... C10M 123/02
(52) U.S. Cl. ...................... 508/485; 508/496; 508/499; 508/519; 508/521; 508/522; 508/539; 508/552
(58) Field of Search ................................ 508/522, 485

(56) References Cited

U.S. PATENT DOCUMENTS

| | | | | |
|---|---|---|---|---|
| 4,505,832 A | * | 3/1985 | Whiteman et al. | 508/552 |
| 5,614,478 A | * | 3/1997 | Gates | 508/136 |
| 5,707,944 A | * | 1/1998 | Yokouchi et al. | 508/485 |
| 6,063,740 A | * | 5/2000 | Kinoshita et al. | 508/364 |
| 6,235,690 B1 | * | 5/2001 | Shibayama et al. | 508/462 |
| 6,239,085 B1 | * | 5/2001 | Slack | 508/539 |
| 6,333,297 B2 | * | 12/2001 | Takabe | 508/364 |
| 6,355,602 B1 | * | 3/2002 | Okaniwa et al. | 508/168 |
| 6,417,143 B1 | * | 7/2002 | Mikami et al. | 508/465 |
| 6,444,621 B1 | * | 9/2002 | Okaniwa et al. | 508/168 |

FOREIGN PATENT DOCUMENTS

| | | |
|---|---|---|
| JP | 2000-26875 | 1/2000 |
| JP | 2000-63874 | 2/2000 |

\* cited by examiner

*Primary Examiner*—Ellen M McAvoy
(74) *Attorney, Agent, or Firm*—Jordan and Hamburg LLP

(57) ABSTRACT

In a grease composition which essentially comprises a base oil and a thickener, a mixture of a urea compound and lithium soap is blended as the thickener. The content of the urea compound in the thickener is preferably set to 20 to 80 wt %. As the urea compound, an alkyl group- or cyclohexyl group-terminated diurea compound, or, particularly, a diurea compound in which the diisocyanate component is 4,4'-diphenylmethane diisocyanate is preferably used. In a rolling bearing which is lubricated by the grease composition, the acoustic performance is largely improved by a synergistic action of the lithium soap and the urea compound, and simultaneously also the anti-fretting property is enhanced by an action of the urea compound.

13 Claims, No Drawings

GREASE COMPOSITION AND ROLLING BEARING LUBRICATED BY THE GREASE COMPOSITION

BACKGROUND OF THE INVENTION

The present invention relates to a grease composition which is to be used with being packed in a rolling bearing of a spindle motor for an information apparatus or the like.

Conventionally, a grease composition in which an ester is used as the base oil and lithium soap is used as a thickener is packed in many rolling bearings such as a ball bearing of a spindle motor for a recording apparatus such as a hard disk drive (HDD) of a computer.

A typical example of such a grease composition is a grease composition in which pentaerythritol and di-2-ethylhexyl sebacate are used as the base oil, and lithium stearate and lithium 12-hydroxystearate are used as a thickener. The grease composition does not contribute to improvement of the anti-fretting property of a rolling bearing, but has advantages that the vibration value of a rolling bearing is reduced, and that the acoustic life is improved.

Because of an enhanced accuracy and an increased number of revolutions which are caused by the recent increase in recording density, a rolling bearing is requested to have a higher acoustic performance. Therefore, the acoustic performance of the above-mentioned grease composition becomes insufficient to cope with such a higher acoustic performance.

Recently, a loading mechanism for a magnetic head is being shifted from the CSS (Contact Start/Stop) method to the ramp load/unload method. When external vibrations are applied to an HDD during the transportation process or the like, therefore, an HDD motor is minutely vibrated and fretting occurs in a transfer surface of a rolling bearing, whereby the noise level is often raised. In order to solve this problem, a request to a rolling bearing for the anti-fretting property is enhanced, and it is therefore difficult for the above-mentioned grease composition to satisfy the request.

SUMMARY OF THE INVENTION

The invention has been conducted in order to solve the above-discussed problems. It is an object of the invention to provide a grease composition which can improve both the acoustic performance and anti-fretting property of a rolling bearing, and a rolling bearing which is lubricated by such a grease composition.

In order to attain the object, the grease composition of the invention is a grease composition which essentially comprises a base oil and a thickener, and characterized in that the thickener consists of a mixture of a urea compound and lithium soap.

When, as in the grease composition, a mixture of a urea compound and lithium soap is blended as a thickener, the lithium soap acts synergistically with the urea compound to largely contribute to improvement of the acoustic performance of a rolling bearing, so that the acoustic performance is remarkably enhanced as compared with the case where a thickener comprising only lithium soap is blended. Furthermore, the urea compound largely contributes to improvement of the anti-fretting property of the rolling bearing. Therefore, also the anti-fretting property can be simultaneously enhanced. This fact is supported by data of examples and comparative examples which will be described later.

The rolling bearing of the invention is characterized in that the rolling bearing is lubricated by the grease composition, and hence provided with a high acoustic performance and an excellent anti-fretting property by the action of the grease composition.

DETAILED DESCRIPTION OF THE PREFERRED EMBODIMENTS

Hereinafter, specific embodiments of the grease composition of the invention will be described in detail.

In the grease composition of the invention, preferably, the mixture of a urea compound and lithium soap which is to be blended as a thickener contains the urea compound in 20 to 80 wt %. When such a thickener is blended, as described above, the lithium soap acts synergistically with the urea compound to largely contribute to improvement of the acoustic performance of a rolling bearing, and the urea compound largely contributes to improvement of the anti-fretting property of the rolling bearing, with the result that a grease composition which can enhance both the acoustic performance and the anti-fretting property is obtained.

In the case where the content of the urea compound in the thickener is smaller than 20 wt %, the thickener becomes similar to that comprising only lithium soap, and it is therefore difficult to improve the anti-fretting property of a rolling bearing. By contrast, in the case where the content of the urea compound in the thickener is larger than 80 wt %, the thickener becomes similar to that comprising only a urea compound, the anti-fretting property of a rolling bearing can be improved, but the acoustic performance is lowered. In both the cases, therefore, it is difficult to satisfactorily attain the object of the invention.

As the urea compound, useful is an alkyl group- or cyclohexyl group-terminated diurea compound, i.e., alkyl group-terminated aliphatic diurea or cyclohexyl group-terminated alicyclic diurea, or aliphatic/alicyclic diurea which is a mixture of the compounds. Particularly, diurea in which, as indicated by formula 1 below, the diisocyanate component is 4,4'-diphenylmethane diisocyanate is preferably used. Alternatively, diurea in which the diisocyanate component is 2,4'-toluylene diisocyanate, phenylene diisocyanate, or the like may be preferably used.

(1)

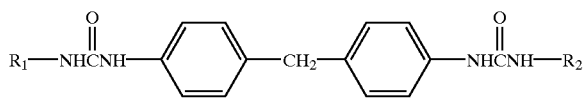

(where $R_1$ and $R_2$ are an alkyl group or a cyclohexyl group)

As the lithium soap, preferably used is lithium soap in which lithium stearate is an essential component, and the lithium stearate contains 0 to 50 wt % of lithium 12-hydroxystearate. Even when lithium stearate is singly mixed with a urea compound, it is possible to provide an excellent acoustic performance. When lithium 12-hydroxystearate is singly mixed with a urea compound, however, it is difficult to improve an acoustic performance. Therefore, it is preferable to use both lithium stearate and lithium 12-hydroxystearate as described above. In this case, preferably, the blending ratio of lithium 12-hydroxystearate is set to be equal to or smaller than that of lithium stearate as described above. When lithium 12-hydroxystearate is blended in a percentage larger than 50 wt %, the acoustic performance is insufficiently improved.

On the other hand, as the base oil which is to be blended into the grease composition of the invention, preferably used is a blended oil comprising one or both of an aliphatic dibasic acid ester and a polyol ester, and poly-α-olefin. As the base oil, only such an ester may be used. When poly-α-olefin which has high heat resistance is mixed with the ester, there are advantages that the life of the base oil is prolonged, and that the anti-fretting property and the acoustic performance are further improved. The mixed quantity of poly-α-olefin in the base oil is preferably set to about 20 to 90 wt %.

As the aliphatic dibasic acid ester, di-2-ethylhexyl sebacate, di-2-ethylhexyl azelate, di-2-ethylhexyl dodecanoic diacid, or the like is preferably used. As the polyol ester, pentaerythritol ester, trimethylolpropane, or the like is preferably used. As the poly-α-olefin, hydrogenated decene-1($C_{10}$α-olefin) oligomer or the like is preferably used. Preferably, the ester and the poly-α-olefin are set to have a kinetic viscosity of about 10 to 40 mm$^2$/s (40° C.) in order to provide a low-torque characteristic.

In the grease composition of the invention, preferably, the content of the base oil is set to 80 to 90 wt %, and that of the thickener is set to 20 to 10 wt %, so that a worked penetration of the entire composition is in a range from 250 to 300. When a grease composition having a worked penetration of this degree is packed in a ball bearing, it is possible to obtain a low-torque ball bearing.

It is a matter of course that an antioxidant, an antirust agent, and other additives are adequately blended in the grease composition of the invention.

On the other hand, the rolling bearing of the invention is a rolling bearing in which the above-mentioned grease composition is packed to lubricate the bearing. As the structure of the rolling bearing, any one of various known rolling bearing structures can be employed. Because of the action of the lubricating grease composition, the rolling bearing of the invention exerts a high acoustic performance and an excellent anti-fretting property.

Next, further specific examples of the invention will be described.

EXAMPLES 1 to 5

Thickeners, base oils, and additives which are listed in Table 1 below were mixed at ratios shown in Examples 1 to 5 of Table 1 and then stirred to prepare grease compositions of Examples 1 to 5. The worked penetrations of the grease compositions were measured. Results of the measurement are shown in Table 1.

Thereafter, the grease compositions were subjected to an anti-fretting property test under the following test conditions. Results of the test are shown in Table 1. In the row of the anti-fretting property test in Table 1, ⊚ indicates that the prevention effect of anti-fretting wear is excellent, ○ indicates that the prevention effect of anti-fretting wear is fair, and X indicates that the prevention effect of anti-fretting wear is poor.

Test Conditions for Anti-fretting Property

| | |
|---|---|
| Used ball bearing: | deep groove ball bearing |
| (inner diameter: 5 mm, outer diameter: 13 mm, width: 4 mm) | |
| Oscillation angle of outer race: | 1 to 5 degrees |
| Oscillation frequency: | 5 to 50 Hz |
| Number of oscillations: | 10,000 times |
| Axial load: | 14.7 N |
| Temperature: | 25° C. |

With respect to the grease compositions of Examples 1 to 5, an acoustic life test of a ball bearing was performed under the following test conditions. Also results of the test are shown in Table 1. In the row of the acoustic life test in Table 1, ⊚ indicates that the sound level of a ball bearing is not substantially raised, ○ indicates that the sound level of a ball bearing is slightly raised, and X indicates that the sound level of a ball bearing is largely raised.

Test conditions for Acoustic Life

| | |
|---|---|
| Used ball bearing: | deep groove ball bearing |
| (inner diameter: 5 mm, outer diameter: 13 mm, width: 4 mm) | |
| Number of revolutions of outer race: | 5,400 rpm |
| Time period: | 1,000 h |
| Preload: | 14.7 N |
| Ambient temperature: | 70° C. |

COMPARATIVE EXAMPLES 1 to 3

Thickeners, base oils, and additives which are listed in Table 1 below were mixed at ratios shown in Comparative examples 1 to 3 of Table 1 and then stirred to prepare grease compositions of Comparative examples 1 to 3. The worked penetrations of the grease compositions were measured. An anti-fretting property test and an acoustic life test were conducted under the same test conditions as those of Examples 1 to 5. Also results of the measurement and the tests are shown in Table 1.

TABLE 1

| | Examples | | | | | Comparative examples | | |
|---|---|---|---|---|---|---|---|---|
| | 1 | 2 | 3 | 4 | 5 | 1 | 2 | 3 |
| Thickener | | | | | | | | |
| Aliphatic/alicyclic diurea (weight part) | 10 | 6 | 3 | 6 | 6 | — | 12 | — |
| Lithium stearate (weight part) | 1 | 4 | 6 | 4 | 9 | 2 | — | 8 |
| Lithium 12-hydroxystearate (weight part) | 1 | 4 | 6 | 4 | — | 10 | — | 8 |
| Base oil | | | | | | | | |
| Pentaerythritol ester (weight part) | 13 | 42 | 63 | 34 | 41 | 70 | — | 84 |

TABLE 1-continued

|  | Examples | | | | | Comparative examples | | |
| --- | --- | --- | --- | --- | --- | --- | --- | --- |
|  | 1 | 2 | 3 | 4 | 5 | 1 | 2 | 3 |
| Di-2-ethylhexyl sebacate (weight part) | — | — | — | 8 | — | 18 | — | — |
| Poly-α-olefin (weight part) | 75 | 44 | 22 | 44 | 44 | — | 88 | — |
| Additive (antioxidant and antirust agent) (weight part) | 4 | 4 | 4 | 4 | 4 | 4 | 4 | 4 |
| Worked penetration (25° C.) | 269 | 280 | 292 | 286 | 283 | 255 | 243 | 265 |
| Anti-fretting property test | ⊚ | ⊚ | ○ | ○ | ○ | X | ⊚ | X |
| Acoustic life test | ○ | ⊚ | ⊚ | ○ | ⊚ | ○ | X | ○ |

(Notes)
Pentaerythritol ester: kinetic viscosity of 30 mm$^2$/s at 40° C.
Di-2-ethylhexyl sebacate: kinetic viscosity of 12 mm$^2$/s at 40° C.
Poly-α-olefin: kinetic viscosity of 30 mm$^2$/s at 40° C.

In Table 1 above, the grease compositions of Comparative examples 1 and 3 which contain only lithium soap as the thickener, and which do not contain aliphatic/alicyclic diurea are excellent in acoustic life, but poor in anti-fretting property. The grease composition of Comparative example 2 which contains only aliphatic/alicyclic diurea as a thickener and does not contain lithium soap is excellent in anti-fretting property, but poor in acoustic life. By contrast, the grease compositions of Examples 1 to 5 in which a mixture of aliphatic/alicyclic diurea and lithium soap is used as a thickener are excellent or satisfactory both in anti-fretting property and acoustic life. Namely, it will be seen that the grease compositions attain the object of the invention. In all of the grease compositions of Examples 1 to 5, the content of the diurea in the thickener is in the range from 20 to 80 wt %. From the above, it will be seen that, when the content of the diurea is set to 20 to 80 wt %, the anti-fretting property and the acoustic performance can be surely enhanced.

When Examples 2 and 4 are compared with each other, it will be seen that a polyol ester such as pentaerythritol ester is more effective than an aliphatic dibasic acid ester such as di-2-ethylhexyl sebacate. When Examples 1 and 3 are compared with each other, the grease composition of Example 1 which contains diurea in a larger quantity or 80 wt % in the thickener is more excellent in anti-fretting property, and that of Example 3 which contains lithium soap in a larger quantity or 80 wt % in the thickener is more excellent in acoustic life. From this, it will be seen that diurea effectively acts on improvement of the anti-fretting property, and lithium soap effectively acts on improvement of the acoustic life.

As apparent from the above description, the grease composition of the invention attains a remarkable effect that both the acoustic performance and anti-fretting property of a rolling bearing can be simultaneously improved, and therefore can be suitably used in a rolling bearing of a spindle motor for an information apparatus or the like which is requested to have a high acoustic performance and a high anti-fretting property. The rolling bearing of the invention which is lubricated by the grease composition attains an advantage that an excellent acoustic performance and an excellent anti-fretting property are exerted by the function of the grease composition.

What is claimed is:

1. A grease composition, comprising a base oil and a thickener, said thickener consisting essentially of a mixture of a urea compound and lithium soap, a content of said urea compound in said thickener being about 20 to about 80 percent by weight.

2. A grease composition according to claim 1, wherein said urea compound is an alkyl group- or cyclohexyl group-terminated diurea compound.

3. A grease composition according to claim 2, wherein a diisocyanate component of said diurea compound is 4,4'-dipheuylmethane diisocyanate.

4. A grease composition according to claim 1 or 2, wherein said lithium soap includes lithium stearate, and further includes 0 to about 50 percent by weight of lithium 12-hydroxystearate.

5. A grease composition according to claim 1 or 2, wherein said base oil includes at least one or both ester selected from the group consisting of an aliphatic dibasic acid ester and a polyol ester, and additionally includes poly-α-olefin.

6. A grease composition according to claim 1 or 2, wherein said grease composition is to be used as packing in a rolling bearing of a spindle motor for an information apparatus.

7. A rolling bearing which is lubricated by a grease composition according to claim 1 or 2.

8. A grease composition according to claim 1, wherein said base oil comprises about 80 to about 90 percent by weight, and said thickener comprises about 10 to about 20 percent by weight, of the grease composition.

9. A grease composition according to claim 2, wherein a diisocyanate component of the diurea compound is selected from the group consisting of 4,4'-diphenylmethane diisocyanate, 2,4'-toluylene diisocyanate and phenylene diisocyanate.

10. A grease composition according to claim 5, wherein the aliphatic dibasic acid ester is selected from the group consisting of di-2-ethylhexyl sebacate, di-2-ethylhexyl azelate and di-2-ethylhexyl dodecanoic diacid.

11. A grease composition according to claim 5, wherein the polyol ester is selected from the group consisting of pentaerythritol ester and trimethylolpropane.

12. A grease composition according to claim 5, wherein the poly-α-olefin includes hydrogenated decene-1($C_{10}$ α-olefin).

13. A grease composition according to claim 5, wherein said at least one ester and said poly-α-olefin have a kinetic viscosity of about 10 to about 40 mm$^2$/s at 40° C.

* * * * *